United States Patent
Chiu et al.

(10) Patent No.: US 10,210,168 B2
(45) Date of Patent: Feb. 19, 2019

(54) MANAGING DATA IN STORAGE ACCORDING TO A LOG STRUCTURE

(71) Applicant: International Business Machines Corporation, Armonk, NY (US)

(72) Inventors: Lawrence Y. Chiu, Saratoga, CA (US); Paul H. Muench, San Jose, CA (US); Sangeetha Seshadri, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 815 days.

(21) Appl. No.: 14/629,041

(22) Filed: Feb. 23, 2015

(65) Prior Publication Data

US 2016/0246830 A1 Aug. 25, 2016

(51) Int. Cl.
G06F 17/30 (2006.01)
(52) U.S. Cl.
CPC .. G06F 17/30144 (2013.01); G06F 17/30091 (2013.01)
(58) Field of Classification Search
CPC ......... G06F 17/30336; G06F 17/30312; G06F 17/30327; G06F 17/30961; G06F 17/30286
USPC ........................................................ 707/696
See application file for complete search history.

(56) References Cited

U.S. PATENT DOCUMENTS

| | | | |
|---|---|---|---|
| 5,530,850 A * | 6/1996 | Ford .................... | G06F 3/0601 707/813 |
| 8,495,036 B2 | 7/2013 | Calder et al. | |
| 8,725,982 B2 * | 5/2014 | Tene ................... | G06F 12/0253 707/813 |
| 8,819,382 B2 | 8/2014 | Pizlo et al. | |
| 9,460,008 B1 * | 10/2016 | Leshinsky ......... | G06F 17/30185 |
| 2007/0130238 A1 * | 6/2007 | Harris .................... | G06F 8/443 |
| 2009/0063548 A1 * | 3/2009 | Rusher ............. | G06F 17/30309 |
| 2012/0102298 A1 | 4/2012 | Sengupta et al. | |

(Continued)

FOREIGN PATENT DOCUMENTS

| | | |
|---|---|---|
| CN | 102436420 A | 5/2012 |
| CN | 102567218 A | 7/2012 |

OTHER PUBLICATIONS

CN102436420A English Translation.

(Continued)

*Primary Examiner* — Michael Pham
(74) *Attorney, Agent, or Firm* — David W. Victor; Konrad Raynes Davda & Victor LLP

(57) ABSTRACT

Provided are a computer program product, system, and method for managing data in a storage. Each index entry in and index identifies a log address in the log of one of the records. Each record in the log includes a key and value, and the log addresses map to physical addresses in the storage. A plurality of processed log addresses in the log are processed by determining whether the index indicates that the processed log address includes a current version of the record in the log; adding the record at the processed log address to a selected log address in the log in response to determining that the index indicates that the processed log address comprises the current version of the record; and deleting a record at the physical address in the storage to which the processed log address maps.

24 Claims, 5 Drawing Sheets

(56) References Cited

U.S. PATENT DOCUMENTS

| | | | |
|---|---|---|---|
| 2012/0159098 A1 | 6/2012 | Cheung et al. | |
| 2013/0024460 A1* | 1/2013 | Peterson | G06F 3/061 |
| | | | 707/741 |
| 2013/0086303 A1 | 4/2013 | Ludwig et al. | |
| 2013/0346720 A1* | 12/2013 | Colgrove | G06F 3/0608 |
| | | | 711/165 |
| 2014/0207997 A1 | 7/2014 | Peterson et al. | |
| 2016/0246536 A1* | 8/2016 | Chiu | G06F 17/30 |
| 2017/0024315 A1* | 1/2017 | Leshinsky | G06F 17/30185 |

OTHER PUBLICATIONS

CN102567218 English Translation.

US20120102298 is the English counterpart of CN102436420.

US20120159098 is the English counterpart of CN102567218.

PCT International Search Report and Written Opinion dated Jun. 6, 2016, pp. x, for Serial No. PCT/IB2016/050749.

Arpaci-Dusseau, A.C., et al., "Removing the Costs of Indirection in Flash-based SSDs with Nameless Writes", Proceedings of the 10th USENIX conference on File and Storage Technologies, 2012, Total 5 pp.

Debnath, B., et al."SkimpyStash: RAM Space Skimpy Key-Value Store on Flash-based Storage", SIGMOD'11, Jun. 12-16, 2011, Copyright 2011 ACM, Total 12 pp.

Eklektix, Inc., "Log-structured File Systems: There's One in Every SSD [LWN.net]", [online], [Retrieved on Jan. 20, 2015]. Retrieved from the Internet at: <URL: http://lwn.net/Articles/353411/>, Copyright © 2009, Eklektix, Inc., Total 29 pp.

Koltsidas, I. and S.D. Viglas, "Data Management Over Flash Memory", Proceedings of the 2011 ACM SIGMOD International Conference on Management of data, SIGMOD'11, Jun. 12-16, 2011, Copyright 2011 ACM, Total 4 pp.

Zhang, Y., et al., "De-indirection for Flash-based SSDs with Nameless Writes", in Proceedings of the 10th USENIX conference on File and Storage Technologies, 2012.Total 16 pp.

US Application Serial number Unknown, filed Feb. 23, 2015, entitled "Handling Failure of a Command to Add a Record to a Log", 30 pp.

Reply dated Dec. 6, 2017. pp. 8, to GB Exam Report dated Oct. 11, 2017, p. 5, for Application No. GB1713659.9, filed Feb. 12, 2016.

GB Exam Report dated Oct. 11, 2017, p. 5, for Application No. GB1713659.9, filed Feb. 12, 2016.

I. Grigorik, "SSTable and Log Structured Storage: LevelDB", pp. 5.

* cited by examiner

Index Entry

Record

Logical to Physical Mapping Entry

Move Command

Put Command

US 10,210,168 B2

MANAGING DATA IN STORAGE ACCORDING TO A LOG STRUCTURE

BACKGROUND OF THE INVENTION

1. Field of the Invention

The present invention relates to a computer program product, system, and method for managing data in storage according to a log structure.

2. Description of the Related Art

In a log structured storage system, updates to data are not written in place, but written to a selected logical and physical address. Data may be stored in a key-value store, where data is stored in unstructured records consisting of a key plus the values associated with that record. An index having the keys and log addresses for records in the log may be used to look up the log address in the log for the record. Each index entry has the indexed key that is unique in a namespace or set of data and an address of the data in a log.

In the log structured storage, updates are written to an end of the log, and previous versions of the record in the log remain. When an entry at a log address in the log no longer has a corresponding index entry identifying the log address, then the entry in the log is deemed unused and can be garbage collected. However, since the granularity of garbage collection ("region/slot") is much larger (coarser) than the granularity of data (key-value record), in order to garbage collect an entire slot, some potentially valid entries in the slot may have to be relocated. To look up a relocated entry where the index is still pointing to an old location, the storage layer may maintain an indirection table mapping the old entry to the new entry. The indirection table is used to redirect a request for a record to the old address to the new address when an index is not available to provide the current address for a record. Indirection results in longer lookup times and a performance penalty to map an old address to the new address, which then must be mapped to the physical address to access the record.

Another technique for performing garbage collection is a compaction process that reads and re-writes all data to a reclaim space. This requires that both live and old data be moved to free-up space to make available for subsequently received data. Compaction is Input/Output intensive because both live and deleted data needs to be read and rewritten to the new space.

In embodiments where the storage layer places a tombstone record in the log indicating an outdated record, garbage collection must scan the log to process the tombstone records to determine the records to delete.

There is a need in the art for improved techniques for performing garbage collection of a storage system and in a log structured storage system in particular.

SUMMARY

Provided are a computer program product, system, and method for managing data in a storage according to a log structure. An index to records in a log has entries, wherein each index entry in the index identifies a log address in the log of one of the records. Each record in the log includes a key and value, and the log addresses map to physical addresses in the storage. A plurality of processed log addresses in the log are processed by performing for each of the log addresses: determining whether the index indicates that the processed log address includes a current version of the record in the log; adding the record at the processed log address to a selected log address in the log in response to determining that the index indicates that the processed log address comprises the current version of the record; and deleting a record at the physical address in the storage to which the processed log address maps.

DETAILED DESCRIPTION

Described embodiments provide techniques to perform garbage collection of a log structured storage, where the log has records in log addresses according to a log structure that map to physical addresses in one or more storage devices. An index of the log has index entries having the key and log address. Each record in the log includes a key-value identified in the index entry for the record. The log address may describe a log offset that maps to a physical address in the storage. A plurality of records in the log are processed by determining whether the index indicates that the processed record comprises a current version of the record in the log. If the record is the current version, the record is then written to a selected log address in the log. The processed records are deleted in the log to reclaim storage space in the storage mapping to the log addresses of the deleted processed records. Further, the index entries for the processed records that are the current version of the data that are moved to the selected log address are updated to indicate the new selected log addresses in the log.

Figure 1:
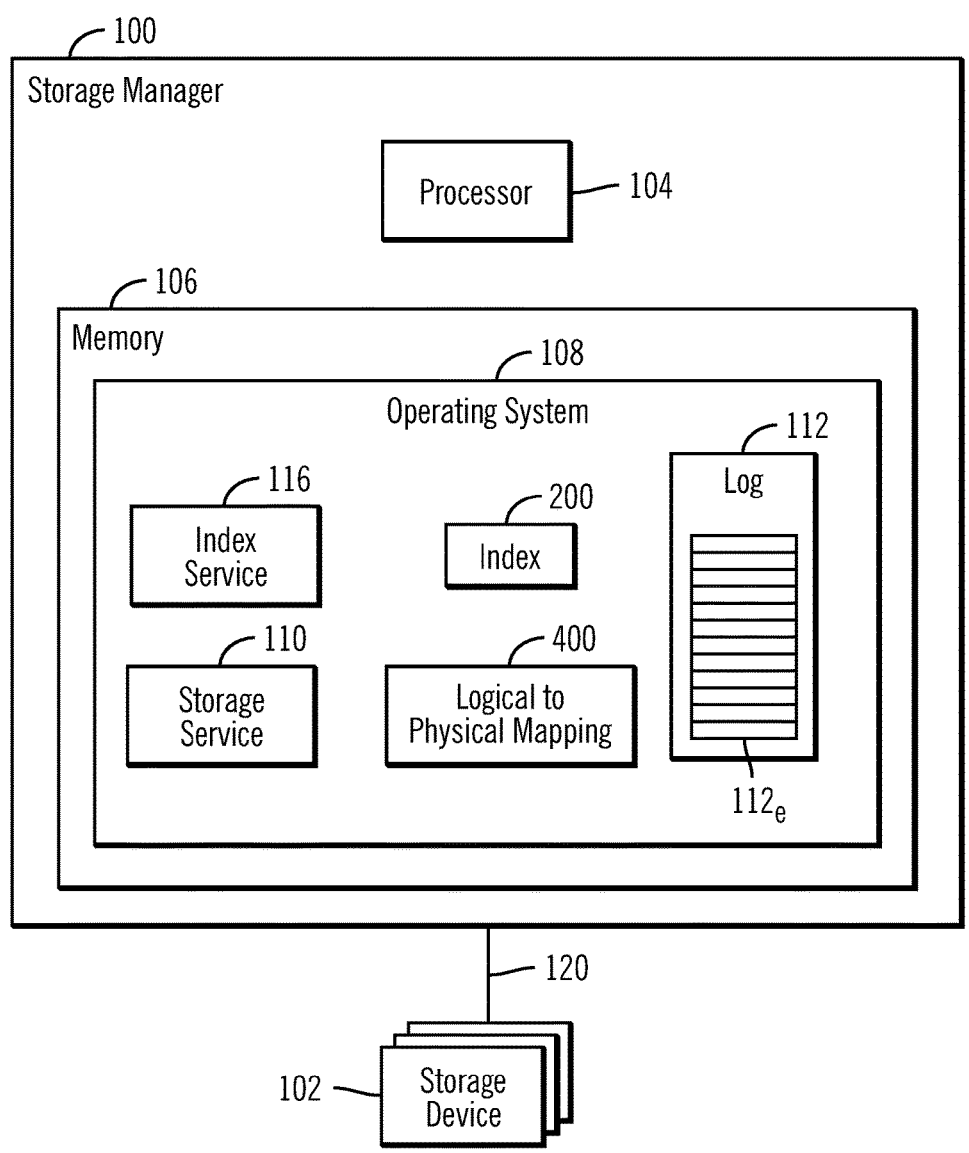
FIG. 1 illustrates an embodiment of a storage environment.

Certain embodiments may avoid the need of using an indirection table, because as part of the garbage collection process, the index is updated with the new address of the record, so there is no need to translate between an old address and new address for the record in the log. Further, with described embodiments, only records in the log having live, i.e., valid, data are written to a new location in the log, thereby avoiding the need to read and move all data records. Instead, in described embodiments, the index is used to determine the live records that need to be moved to the end of the log. After moving all the records to the end of the log that have live data, all the records in the log entries that have been processed may be deleted, thus avoiding the intensive Input/Output operations needed for a compaction garbage collection operation FIG. 1 illustrates a storage environment having a storage manager 100 managing the storage of data on one or more storage devices 102. Host systems (not shown) may communicate Input/Output (I/O) requests to the storage manager 100 to access the data in the storage devices 102. The storage manager 100 includes a processor 104, comprising one or more processor devices and a memory 106 in which an operating system 108 is loaded to be executed by the processor 104. The operating system 108 includes a storage service 110 to manage a log 112 that has records identifying data that is stored at locations in the storage devices 102. The storage service 110 maintains a logical-to-physical mapping 400 that maps log addresses of records in the log 112 to physical addresses in the storage devices 102. An index service 116 maintains an index 200 allowing for key-log address lookup of the records in the log 112. The index service 116 indicates the log addresses having current versions of the records having the indicated key for the log addresses. The log 112 may comprise a sequential log in which new records are added to the end of the log, i.e., the most recently used end, such as a log structured array data structure. The storage service 110 uses the index 200 to lookup records in the log 112 to determine if a record at a log address in the log 112 has a current or live version of the record. The storage manager 100 may be implemented in a server that manages I/O requests from multiple host systems or it may be implemented in a storage controller firmware, or other components in the system.

Upon receiving a request for data associated with a record having a provided key- and value, the storage service 110 can invoke the index service 116 to lookup the log addresses of the records in the index 200 having that specified key. From those log addresses returned from the index, the storage service 110 can determine from the returned log addresses, the log address record having the key and value of the requested record. From the log address in the log 112, the storage service 110 can use the logical-to-physical mapping 400 to determine the physical address in one of the storage devices 102 at which the data for the record at the log address is stored.

The storage manager 100 communicates with the storage devices 102 via connection 120. The connection 120 may comprise one or more networks, such as a Local Area Network (LAN), Storage Area Network (SAN), Wide Area Network (WAN), peer-to-peer network, wireless network, Internet, Intranet, etc. Alternatively, the connection 120 may comprise bus interfaces, such as a Peripheral Component Interconnect (PCI) bus or serial interface.

The storage devices 102 may comprise different types or classes of storage devices, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices 102 may further be configured into an array of devices, such as Just a Bunch of Disks (JBOD), Direct Access Storage Device (DASD), Redundant Array of Independent Disks (RAID) array, virtualization device, etc. Further, the storage devices 102 may comprise heterogeneous storage devices from different vendors or from the same vendor.

FIG. 1 shows the storage service 110 and index service 116 as components in the same operating system 108. Alternatively, the storage service 110 and/or index service 116 may comprise application programs that execute in a user space, not the operating system 108 kernel space. Further, the storage service 110 and index service 116 may be implemented in different computers or different computer nodes and communicate over a network, or in systems other than a storage controller. Alternatively, the storage service 110 and index service 1216 may be implemented with hardware logic, such as an Application Specific Integrated Circuit (ASIC), or as a programmable processor executing code in a computer readable storage medium. The storage service 110 and index service 116 may also be implemented in virtual machines.

Figure 2:
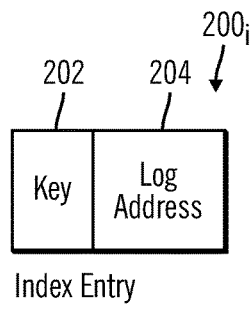
FIG. 2 illustrates an embodiment of an index entry.

FIG. 2 illustrates an embodiment of an instance of an index entry $200_i$ in the index 200, and includes a key 202 and log address 204 pair, where the log address 204 identifies a location in the log 112 of the record identified by the index entry $200_i$. Although there may be multiple versions of a record, i.e., unique key-value pair, in the log 112, the index 200 would only include one index entry $200_i$ for a key and log address to provide the log addresses that have current versions of a record. Other records for the key-value pair in the log 112 whose log address is not included in the index 200 comprise non-active or previous versions of the record that map to physical addresses in the storage device 102 that do not have the most current version of the data identified by the record.

Figure 3:
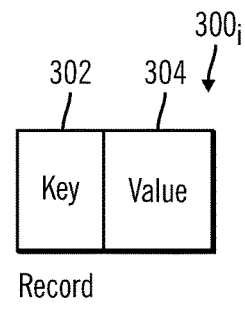
FIG. 3 illustrates an embodiment of a record in the log storage.

FIG. 3 illustrates an embodiment of an instance of a record $300_i$ included in the log 112, and includes a key 302 and value 304 pair. The record $300_i$ may further include a pointer to the log address in the log 112 having a previous version of the record. The log 112 may store records in sequential order, so a new record is added to the end of the log, such as entry $112_e$ shown in FIG. 1. The record $300_i$ may further indicate the key size and value size.

Figure 4:
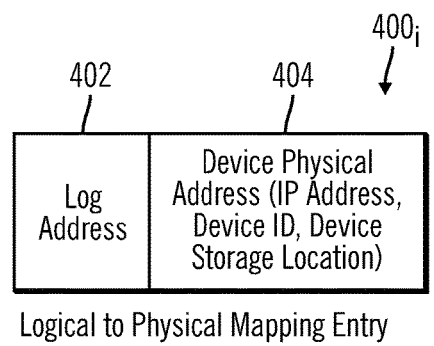
FIG. 4 illustrates an embodiment of a logical-to-physical mapping.

FIG. 4 illustrates an embodiment of an entry $400_i$ in the logical-to-physical mapping 400, including a log address 402 and a corresponding device physical address 404 in one of the storage devices 102. The device physical address 404 may include a network address (e.g., Internet Protocol address, MAC address), unique device ID, and a physical location in the storage device 102. In this way, the mapping 400 maps the log 112 addresses or entries in the log 112 to physical address across multiple storage devices 102, or in a single storage device 102 as the case may be. For example, if there are two storage devices, the log 112 may comprise an abstraction that provides for storing data in sequential addresses in a first storage device followed by storing data in addresses in a second storage device. In alternative embodiments, the logical to physical mapping 400 may provide a mapping of sequential log addresses to alternate between the storage devices to interleave storing data in different of the storage devices according to a pre-defined sequence implemented in the logical to physical mapping 400.

Figure 5:
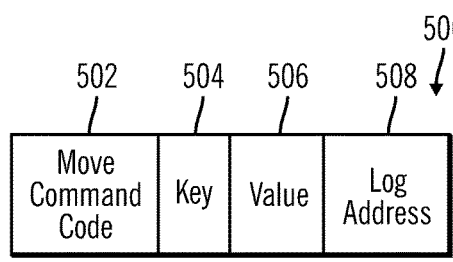
FIG. 5 illustrates an embodiment of a move command.

FIG. 5 illustrates an embodiment of a move command 500 that the storage service 110 may issue to cause the index service 116 to move a record to the end of the log $112_e$ at a new log address as part of a garbage collection or other operation. The move command 500 includes a move command code 502 identifying the move command and a key 504, key value 506, and log address 508 of the record having the key 504 and value 506 pair to move to the end of the log $112_e$.

Figure 6:
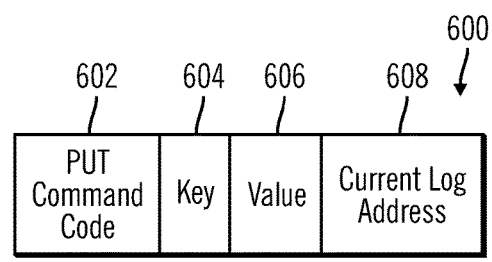
FIG. 6 illustrates an embodiment of a PUT command.

FIG. 6 illustrates an embodiment of a PUT command 600 used by the index service 108 to add a new record to the end of the log $112_e$, or whatever location is the most recently used end of the log 112. The PUT command 600 includes a PUT command code 602, a key 604, a key value 606, and a log address 608 of the record being updated by the key 602 and value 604, where the added record is added to the most recently used end of the log $112_e$. The storage service 110 may return the log address of the location in the log $112_e$ to which the record having the key 602 and value 604 of the command 600 was added.

The commands used to include the information in FIGS. 5 and 6 may comprise command types other than a MOVE and PUT commands.

Figure 7:
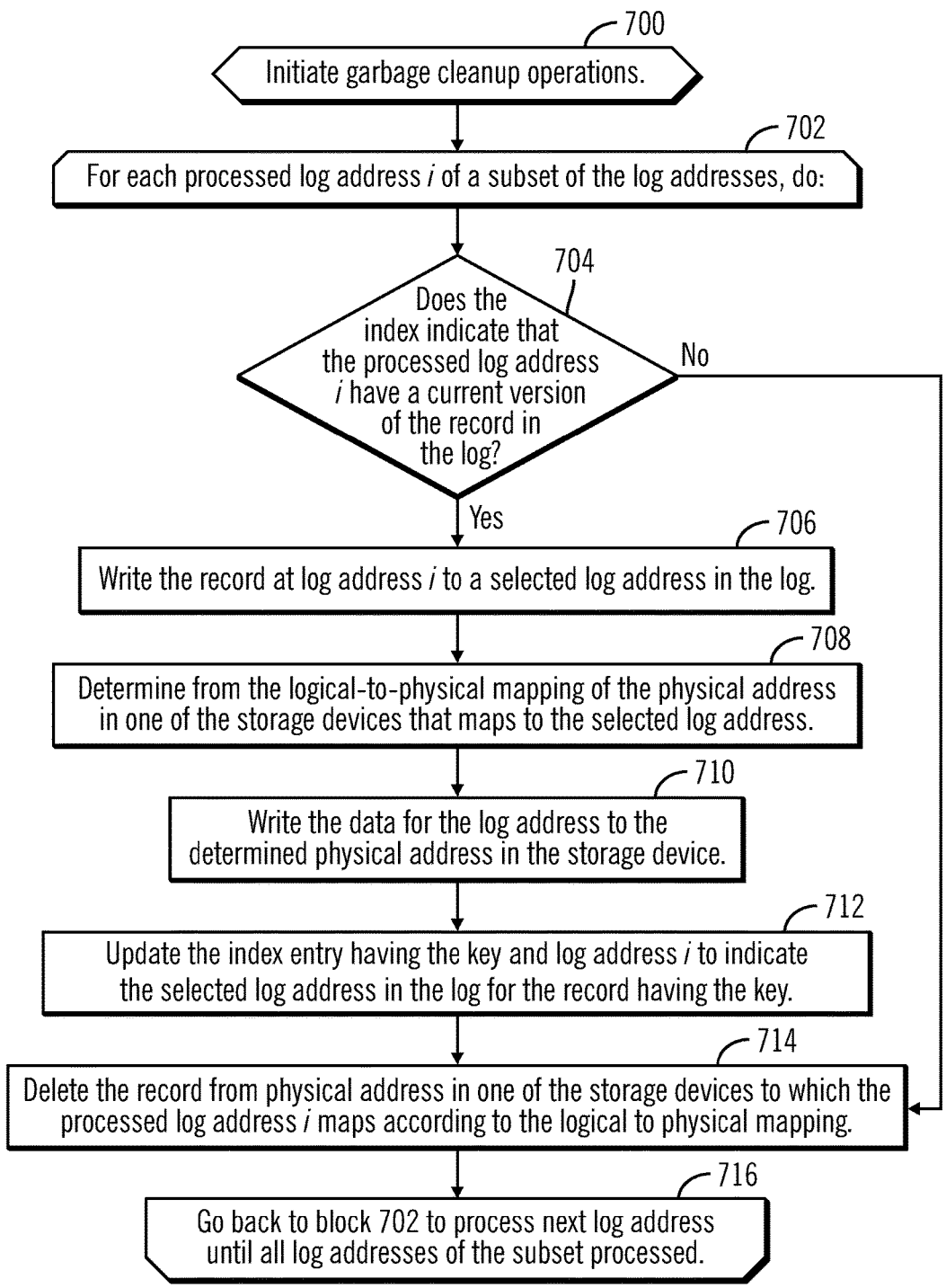
FIGS. 7 and 8 illustrate embodiments of operations to perform garbage collection of a log structured storage.

FIG. 7 illustrates an embodiment of operations performed by the storage manager 100 components, such as the storage service 110 and index service 116, to perform garbage collection to reclaim space in the log 112 and storage 102, or other components. Upon initiating (at block 700) garbage collection operations, a loop of operations is performed at blocks 702 through 716 for each of a plurality of processed log addresses of a subset of the log addresses in the log 112, where each subset may comprise a fixed range of sequential log addresses records in the log 112. For a processed log address i of the subset, a determination is made (at block 704) as to whether the index 200 indicates that the processed log address i comprises a current version of the record. In certain embodiments, the determination of whether a log address has a current version of a record may comprise determining whether the log address of the record in the log 112 is indicated in an index $200_i$ entry having the key of the record at the processed log address i. In such embodiments, the index 200 indicates includes entries indicating the log addresses having current versions of records with the indicated key. In this way, the processed log address i has the current version of a record when that log address i in the log 112 is indicated in the log address 204 of the index entry $200_i$ having the key 202 in the record $300_i$ for the processed log address i.

If (at block 704) the processed log address i has the current version of that record (key-value pair), then that record i is written (at block 706) to a selected log address in the log 112, such as at the Most Recently Used (MRU) end of the log $112_e$. A determination is made (at block 708) from the logical-to-physical mapping 400 of the physical address in one of the storage devices 102 that maps to the selected log address. The storage service 110 may then write (at block 710) the data for the current version of the record i in the storage device 102 to the determined physical address in the storage device 102. The index service 116 may then update (at block 712) the index entry $200_i$ having the key 202 and processed log address i to indicate the selected log address 206 in the log 112 to which the record at processed log address i was copied or moved. The record at the physical address in the storage device 102 to which the processed log address i maps according to the logical to physical mapping entry $400_i$ for the processed log address i may then be deleted (at block 714) from the log 112 to reclaim the space in the storage device 102 to which the processed log address i maps. Further, if (at block 704) the record i is not the current version of the record (i.e., whose log address is not indicated in the index entry for the record i), then control proceeds to block 714 to delete record i from the log address from which it was processed in the subset of records. In this way, data in the storage device 102 mapping to log addresses having non-active data are deleted. From block 714, control proceeds to block 716 to process any further log addresses in the subset not yet processed.

With the described operations of FIG. 7, a subset of the log addresses in the log 112 are processed to copy any current or active records to the most recently used end of the log $112_e$ and remove the data for the older version of the record at the processed log address. At the end of the processing of the subset of log addresses, any active records have been moved to the end of the log $112_e$, the older version of the data in the storage device 102 is deleted, and the data in the storage device 102 is copied to a physical address corresponding to the selected new log address for other record. The records in the subset may then be reclaimed by deleting the data in the storage device 102 at physical addresses mapping to the processed log addresses in the subset. This allows for removal of older versions of records and data to free up space in the storage device 102 for new writes. Further, the processed log address may be invalidated to be available for further active data.

Figure 8:
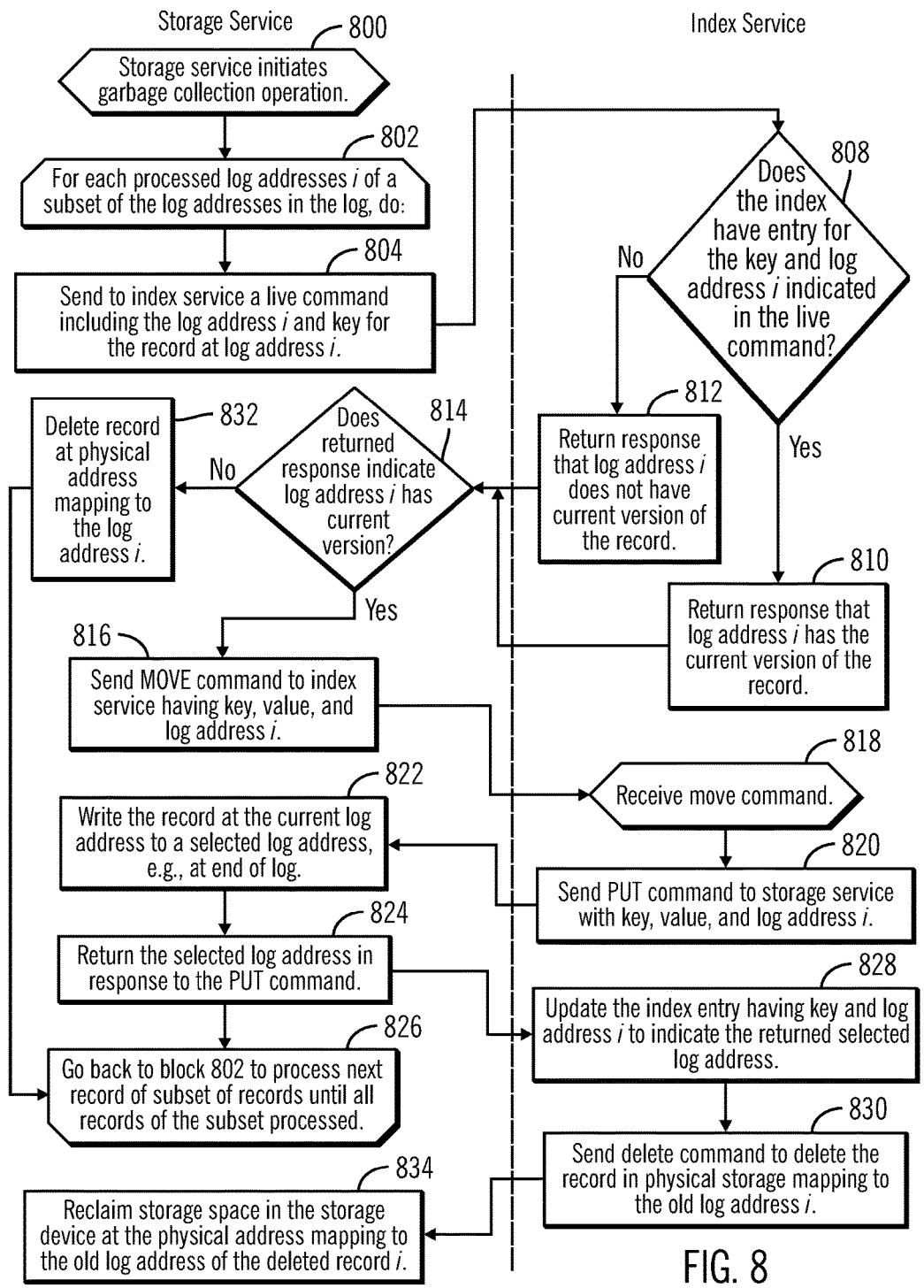

FIG. 8 illustrates an embodiment of operations performed by the storage service 110 and the index service 116 to perform a garbage collection operation on a subset of log addresses in the log 112. Control begins with the storage service 110 initiating (at block 800) a garbage collection operation by performing a loop of operations at blocks 802 through 826 for each processed log address i of a plurality of log addresses from a subset of log addresses in the log 112. At block 804, the storage service 110 sends a live command including the log address i and key for the processed log address i to have the index service 116 determine whether the processed log address i has the current version of the record. In response to the live command, the index service 116 determines (at block 808) whether the index 200 has an entry $200_i$ for the key and processed log address i indicated in the live command, where the presence of an entry $200_i$ indicates that processed log address i has the current version of the record.

If (at block 808) the index 200 does not have an entry for the processed log address i and key, then the index service 116 returns (at block 812) a response to the live command indicating that processed log address i does not have the current version of the record. Otherwise, if (at block 810) the index 200 includes an entry $200_i$ having the processed log address record i and key from the live command, then the index service 116 returns (at block 812) a response to the live command indicating that processed log address i is the current version.

Upon receiving the response from block 810 or 812, if (at block 814) the response indicates that the processed log address i has the current version of the record $300_i$, then the storage service 110 sends (at block 816) a MOVE command 500 to the index service 116 indicating in fields 504, 506, and 508 the key 302, value 304 and processed log address i. Upon receiving (at block 818) the move command 500, the index service 116 sends (at block 820) a PUT command 600 to the storage service 110 with the key 504 and value 506 from the move command 500 and processed log address i in fields 604, 606, and 608 of the PUT command 600, respectively. In response to the PUT command 600, the storage service 110 writes (at block 822) the record with the key 604 and value 606 at the log address 606 to a selected log address, such as at the end or most recently used end of the log $112_e$. The selected log address $112_e$ to which the record is written is returned (at block 824) to the index service 116 in response to the PUT command 600. The pointer for the selected log address $112_e$ may be incremented to the next entry in the log 112 to use for the next record to add to the log.

After returning the selected new log address for the record, the storage service 110 may proceed (at block 826) back to block 802 to process a next record in the subset of records in the log 112 being processed, such as a series of sequential records in the log 112.

In response to receiving the response to the PUT command 600 having the new log address, the index service 116 updates (at block 828) the index entry 200i for log address i to indicate the selected log address, which now has the current version of the record in the log $112_e$.

With the described embodiments, the index service 116 uses the key value by including in the PUT command 600 but does not store the key value 506 in the MOVE command 500 in the index 200. In an alternative embodiment, the MOVE command 500 may not include the key value 506, but may just provide the key 504 and log address 508, and then the index service 116 can retrieve the key value from the storage service 110 to include in the PUT command 600.

In one embodiment, the index service 116 may send (at block 830) a delete command to the storage service 110 having the old log address i whose record was moved to the selected log address to cause the storage service 110 to delete the data in the storage device 102 for the old log address. Further, if (at block 814) the returned response to the live command indicated that the record is not the current version, then the storage service 110 may delete (at block 832) the data in the storage device 102 at the physical address mapping to the processed log address i indicated in the logical to physical mapping $400_i$ for the old log address i. In this way, the index service 116 and storage service 110 work together to update the index 200 and reclaim records and storage space from the log 112 and storage devices 102.

In an alternative embodiment, the steps 830 and 834 may not occur, and instead the storage service 110 would delete the records at block 832 when processing a log address in the log that does not have a current version of a record.

In a still further embodiment, the index service 116 may also include the old log address i whose record is moved to the selected log address as part of the PUT operation, allowing the storage manager to maintain a back chain pointing to the prior log address of the record.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
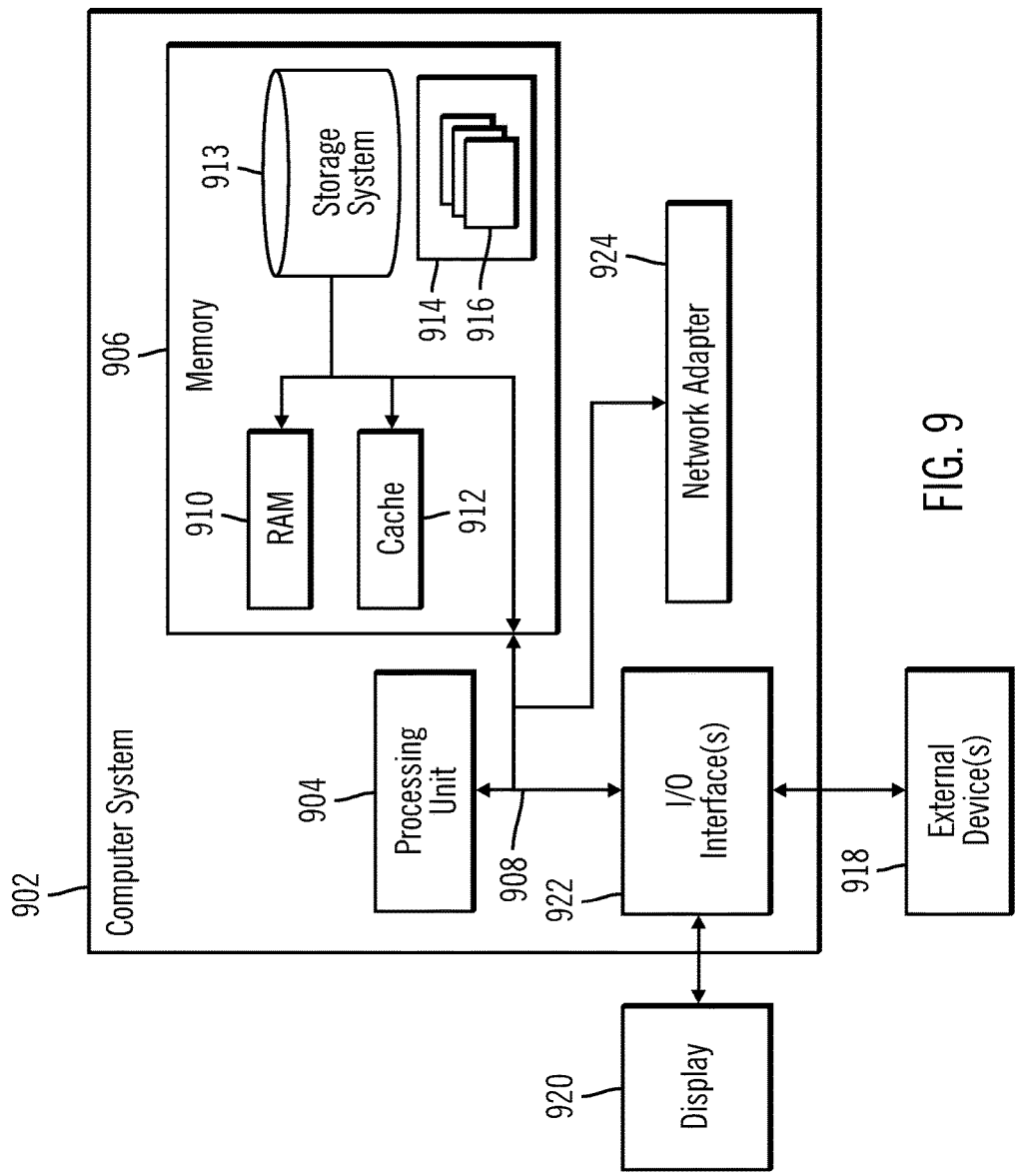
FIG. 9 illustrates an embodiment of a computer architecture used with described embodiments.

The storage manager 100 and components therein, such as the index service 116 and storage service 110, may be implemented in one or more computer systems, such as the computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular resources or implement particular abstract data types. Computer system/server 902 may be practiced in distributed cloud computing environments where resources are performed by remote processing devices that are linked through a communications network. In a distributed cloud computing environment, program modules may be located in both local and remote computer system storage media including memory storage devices.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 2 may be implemented as program modules 916 which generally carry out the functions and/or methodologies of embodiments of the invention as described herein.

Computer system/server 902 may also communicate with one or more external devices 918 such as a keyboard, a pointing device, a display 920, etc.; one or more devices that enable a user to interact with computer system/server 12; and/or any devices (e.g., network card, modem, etc.) that enable computer system/server 902 to communicate with one or more other computing devices. Such communication can occur via Input/output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing data in a storage, the computer program product comprising a computer readable storage medium having computer readable program code embodied therein that executes to perform operations, the operations comprising:

providing an index to records in a log, wherein each index entry in the index identifies a log address in the log of one of the records, wherein each record in the log includes a key and value, and wherein log addresses map to physical addresses in the storage;

processing a plurality of log addresses in the log by performing for each processed log address of the processed log addresses:

determining whether the index indicates that the processed log address includes a current version of the record in the log;

adding the current version of the record at the processed log address to a selected log address at an end of the log in response to determining that the index indicates that the processed log address comprises the current version of the record;

deleting a record at the physical address in the storage to which the processed log address maps in response determining that the processed log address does not include a current version; and deleting a record at the physical address in the storage to which the processed log address maps in response to adding the current version to the selected log address at the end of the log.

2. The computer program product of claim 1, wherein the determining whether the index indicates that the processed log address has the current version of the record comprises:

determining whether the index indicates the processed log address for the key of the record at the processed log address, wherein the index indicates that the record at the processed log address comprises the current version of the record in response to the processed log address being indicated in the index entry having the key of the record at the processed log address.

3. The computer program product of claim 1, wherein the processing the plurality of log addresses further comprises:

updating the index to indicate the selected log address in the log and not indicate the processed log address.

4. The computer program product of claim 1, wherein the processing the plurality of log addresses is performed by a garbage collection process, and wherein the plurality of log addresses that are processed comprise a subset of log addresses in the log, wherein the log addresses in the log are grouped into a plurality of subsets including the subset having the processed log addresses.

5. The computer program product of claim 1, wherein the storage comprises a plurality of storage devices, wherein the log addresses map to physical addresses in the plurality of storage devices, and wherein the data for the records in the log is stored at the physical address in the storage device mapping to the log address identifying the record.

6. The computer program product of claim 5, wherein the storage devices comprise at least one of solid state drives and hard disk drives, and wherein the computer program product, index, and log are implemented in a system external to the storage devices coupled to the system.

7. The computer program product of claim 1, wherein the record at the processed log address is not written to a selected log address in response to determining that the index does not include an entry for the processed log address and key of the record at the processed log address.

8. The computer program product of claim 1, wherein the operations further comprise:

sending, by a storage service, a live command to an index service including the processed log address and a key of the processed log address, wherein the index service in response to the live command performs the determining of whether the processed log address has the current version of the record;

sending, by the index service, a put command to the storage service to perform the adding of the record at the processed log address to the selected log address;

sending, by the storage service, the selected log address of the record to the index service in response to writing the record at the processed log address to the selected log address; and updating, by the index service, the index entry having the processed log address and the key in the put command to indicate the selected log address in response to receiving the selected log address from the storage service.

9. The computer program product of claim 8, wherein the operations further comprise:

sending, by the storage service, a move command with the key and the processed log address in response to the index service indicating that the processed log address comprises the current version of the record in response to the live command; and receiving, by the index service, the move command, wherein the index service performs the sending the put command to the storage service to write the record at the processed log address to the selected log address in response to the move command, wherein the put command includes the value for the key.

10. The computer program product of claim 8, wherein the storage service performs the deleting of the record at a physical address in the storage to which the processed log address maps.

11. A system for managing data in a storage, comprising:
a processor; and
a computer readable storage medium having computer readable program code embodied therein that when executed performs operations, the operations comprising:

providing an index to records in a log, wherein each index entry in the index identifies a log address in the log of one of the records, wherein each record in the log includes a key and value, and wherein log addresses map to physical addresses in the storage;

processing a plurality of log addresses in the log by performing for each processed log address of the processed log addresses:

determining whether the index indicates that the processed log address includes a current version of the record in the log;

adding the current version of the record at the processed log address to a selected log address at an end of the log in response to determining that the index indicates that the processed log address comprises the current version of the record;

deleting a record at the physical address in the storage to which the processed log address maps in response determining that the processed log address does not include a current version; and deleting a record at the physical address in the storage to which the processed log address maps in response to adding the current version to the selected log address at the end of the log.

12. The system of claim 11, wherein the determining whether the index indicates that the processed log address has the current version of the record comprises:

determining whether the index indicates the processed log address for the key of the record at the processed log address, wherein the index indicates that the record at the processed log address comprises the current version of the record in response to the processed log address being indicated in the index entry having the key of the record at the processed log address.

13. The system of claim 11, wherein the processing the plurality of log addresses further comprises:
   updating the index to indicate the selected log address in the log and not indicate the processed log address.

14. The system of claim 11, wherein the storage comprises a plurality of storage devices, wherein the log addresses map to physical addresses in the plurality of storage devices, and wherein the data for the records in the log is stored at the physical address in the storage device mapping to the log address identifying the record.

15. The system of claim 11, wherein the record at the processed log address is not written to a selected log address in response to determining that the index does not include an entry for the processed log address and key of the record at the processed log address.

16. The system of claim 11, wherein the operations further comprise:
   sending, by a storage service, a live command to an index service including the processed log address and a key of the processed log address, wherein the index service in response to the live command performs the determining of whether the processed log address has the current version of the record;
   sending, by the index service, a put command to the storage service to perform the adding of the record at the processed log address to the selected log address;
   sending, by the storage service, the selected log address of the record to the index service in response to writing the record at the processed log address to the selected log address; and
   updating, by the index service, the index entry having the processed log address and the key in the put command to indicate the selected log address in response to receiving the selected log address from the storage service.

17. The system of claim 16, wherein the operations further comprise:
   sending, by the storage service, a move command with the key and the processed log address in response to the index service indicating that the processed log address comprises the current version of the record in response to the live command; and
   receiving, by the index service, the move command, wherein the index service performs the sending the put command to the storage service to write the record at the processed log address to the selected log address in response to the move command, wherein the put command includes the value for the key.

18. A method for managing data in a storage, comprising:
   providing an index to records in a log, wherein each index entry in the index identifies a log address in the log of one of the records, wherein each record in the log includes a key and value, and wherein log addresses map to physical addresses in the storage;
   processing a plurality of log addresses in the log by performing for each processed log address of the processed log addresses:
      determining whether the index indicates that the processed log address includes a current version of the record in the log;
      adding the current version of the record at the processed log address to a selected log address at an end of the log in response to determining that the index indicates that the processed log address comprises the current version of the record;
      deleting a record at the physical address in the storage to which the processed log address maps in response determining that the processed log address does not include a current version; and
      deleting a record at the physical address in the storage to which the processed log address maps in response to adding the current version to the selected log address at the end of the log.

19. The method of claim 18, wherein the determining whether the index indicates that the processed log address has the current version of the record comprises:
   determining whether the index indicates the processed log address for the key of the record at the processed log address, wherein the index indicates that the record at the processed log address comprises the current version of the record in response to the processed log address being indicated in the index entry having the key of the record at the processed log address.

20. The method of claim 18, wherein the processing the plurality of log addresses further comprises:
   updating the index to indicate the selected log address in the log and not indicate the processed log address.

21. The method of claim 18, wherein the storage comprises a plurality of storage devices, wherein the log addresses map to physical addresses in the plurality of storage devices, and wherein the data for the records in the log is stored at the physical address in the storage device mapping to the log address identifying the record.

22. The method of claim 18, wherein the record at the processed log address is not written to a selected log address in response to determining that the index does not include an entry for the processed log address and key of the record at the processed log address.

23. The method of claim 18, further comprising:
   sending, by a storage service, a live command to an index service including the processed log address and a key of the processed log address, wherein the index service in response to the live command performs the determining of whether the processed log address has the current version of the record;
   sending, by the index service, a put command to the storage service to perform the adding of the record at the processed log address to the selected log address;
   sending, by the storage service, the selected log address of the record to the index service in response to writing the record at the processed log address to the selected log address; and
   updating, by the index service, the index entry having the processed log address and the key in the put command to indicate the selected log address in response to receiving the selected log address from the storage service.

24. The method of claim 23, further comprising:
   sending, by the storage service, a move command with the key and the processed log address in response to the index service indicating that the processed log address comprises the current version of the record in response to the live command; and
   receiving, by the index service, the move command, wherein the index service performs the sending the put command to the storage service to write the record at the processed log address to the selected log address in response to the move command, wherein the put command includes the value for the key.

* * * * *